J. E. EMERSON.
SAW.
No. 27,537.  Patented Mar. 20, 1860.
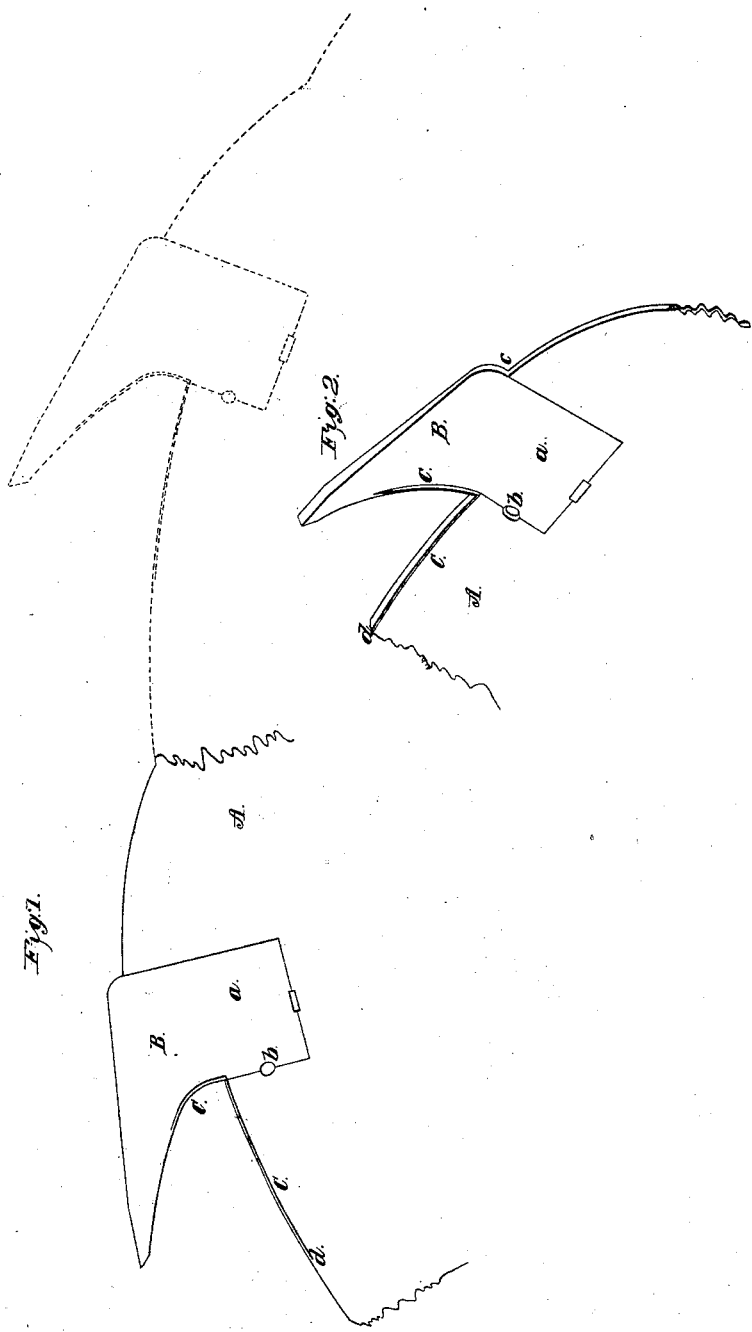

UNITED STATES PATENT OFFICE.

JAMES E. EMERSON, OF SAN FRANCISCO, CALIFORNIA.

SAW.

Specification of Letters Patent No. 27,537, dated March 20, 1860.

*To all whom it may concern:*

Be it known that I, JAMES E. EMERSON, of the city and county of San Francisco and State of California, have invented a new and useful Improvement in Saws; and I do hereby declare that the following is a full, clear, and exact description of the same, reference being had to the annexed drawings, making a part of this specification, in which—

Figure 1 is a side view of a portion of a circular saw, constructed according to my invention. Fig. 2 a perspective view of the same.

Similar letters of reference indicate corresponding parts in the two figures.

This invention consists in having the saw provided with adjustable teeth, and a portion of the under sides of the same and edge of the saw provided with a flanch of a width nearly equal to the cutting edges of the teeth, substantially as hereinafter described, whereby the saw dust is discharged from the kerf, and the choking of the saw, and consequent heating of the same avoided.

To enable those skilled in the art to fully understand and construct my invention I will proceed to describe it.

A represents a portion of a circular saw with one tooth, B, attached to it. This tooth, B, may be of the usual form, and it is constructed with a shank, *a*, having parallel sides and which is fitted in an opening in the saw, and secured therein by a key fitting in a circular opening, *b*, part of which is made in the saw plate and the other part in the shank, *a*, as shown clearly in Figs. 1 and 2. The shank, *a*, of the tooth is fitted in the opening in the saw plate by dove-tail edges, as shown in Fig. 2 at *c*. This prevents any lateral movement of the tooth, while the key in opening, *b*, prevents the outward movement of the tooth. The tooth, B, is made thickest at its outer end and gradually decreases in width toward its back end, and toward the saw plate, the latter being considerably thinner than the cutting edge of the tooth, as shown clearly in Fig. 2. This varying thickness of saw teeth is common to all saws, and they are thus made with a view to prevent friction and the choking of the saws in the kerfs, and the consequent heating of the saws, the wide cutting edges of the teeth forming a kerf wider than the saw plate, and allowing the same to work without rubbing against the sides of the kerf, and allowing space for the dust to pass through. This feature however in the construction of saws does not fully obviate the above mentioned difficulty, the saw dust will frequently choke or clog the saw in the kerf. In order to overcome this difficulty I form a flanch, C, at the inner side of each tooth, said flanches being nearly as wide as the cutting edges of the teeth and extending around on the edge of the plate points, *d*, a little in advance of the points of the teeth. These flanches, C, project out laterally from the teeth and said plate and to, an equal distance at each side, and consequently the under sides of the teeth, B, and the edge of the saw plate immediately opposite them, are nearly equal in width, and, as the saw rotates, form what may be termed chambers in the kerf to carry out the dust made by the teeth. Each tooth having its dust carried out with it, as the flanches, C, prevent it passing into the kerf. This invention however can only be used with adjustable teeth for it will be seen that in ordinary saws, with fixed teeth, the filing away of the teeth in sharpening constantly varies the width of their cut, and the latter would soon be narrower than the flanches, and the saw rendered inoperative. The adjustable teeth therefore are a necessary adjunct of the invention as they may, when worn, be removed and replaced by new ones and the proper relative width of the cutting edges of the teeth and the flanches always preserved.

This invention is applicable to reciprocating saws, the flanches, C, being formed at the under sides of the teeth, and on the saw-plate, in cases where the teeth do not adjoin each other.

I am aware that saws have been constructed with adjustable teeth and I do not claim separately such device, but I do claim as new and desire to secure by Letters Patent:—

The adjustable teeth, B, in combination with the flanches, C, formed on the inner sides of the teeth, and on the edge of the saw plate, substantially as and for the purpose set forth.

JAMES E. EMERSON.

Witnesses:
WM. THOMPSON,
M. M. LIVINGSTON.